(12) United States Patent
Guerrini

(10) Patent No.: US 9,309,154 B2
(45) Date of Patent: Apr. 12, 2016

(54) CEMENTITIOUS PRODUCTS AND ARTICLES OF MANUFACTURE CONTAINING CARBON-DOPED TITANIUM DIOXIDE

(75) Inventor: Gian Luca Guerrini, Milan (IT)

(73) Assignee: ITALCEMENTI S.p.A., Bergamo (IT)

( * ) Notice: Subject to any disclaimer, the term of this patent is extended or adjusted under 35 U.S.C. 154(b) by 396 days.

(21) Appl. No.: 13/501,788

(22) PCT Filed: Oct. 14, 2010

(86) PCT No.: PCT/EP2010/006252
§ 371 (c)(1),
(2), (4) Date: Jun. 28, 2012

(87) PCT Pub. No.: WO2011/045038
PCT Pub. Date: Apr. 21, 2011

(65) Prior Publication Data
US 2012/0270721 A1    Oct. 25, 2012

(30) Foreign Application Priority Data

Oct. 14, 2009 (IT) .............................. MI2009A1766

(51) Int. Cl.
| | |
|---|---|
| *B05D 3/06* | (2006.01) |
| *C04B 28/02* | (2006.01) |
| *C01G 23/047* | (2006.01) |
| *C04B 14/30* | (2006.01) |
| *C04B 111/00* | (2006.01) |

(52) U.S. Cl.
CPC .............. *C04B 28/02* (2013.01); *C01G 23/047* (2013.01); *C04B 14/305* (2013.01); *C01P 2002/52* (2013.01); *C01P 2002/88* (2013.01); *C01P 2006/12* (2013.01); *C04B 2111/00827* (2013.01)

(58) Field of Classification Search
CPC ...................................................... C23C 16/482
USPC ................................................... 427/553, 595
See application file for complete search history.

(56) References Cited

U.S. PATENT DOCUMENTS

| 7,175,911 B2 * | 2/2007 | Zhou et al. .................... 428/403 |
| 2004/0180216 A1 * | 9/2004 | Veerasamy et al. ............ 428/432 |
| 2005/0226761 A1 * | 10/2005 | Orth-Gerber et al. ......... 420/417 |

(Continued)

FOREIGN PATENT DOCUMENTS

WO     WO 2009028451      *  3/2009

OTHER PUBLICATIONS

CN 101385968 B Long et al. (Jun. 9, 2010) abstract only.*

(Continued)

*Primary Examiner* — Dah-Wei D Yuan
*Assistant Examiner* — Nga Leung V Law
(74) *Attorney, Agent, or Firm* — Novak Druce Connolly Bove + Quigg LLP

(57) ABSTRACT

Herein described are cementitious products and articles of manufacture comprising a carbon-doped titanium dioxide, having long-term photocatalytic activity. The titanium dioxide contained therein may be obtained by irradiating titanium dioxide under specific conditions of wavelength, in presence of a gas flow comprising an inert gas and an organic compound. The titanium dioxide thus treated acquires a high and stable carbon content, maintaining the specific surface area thereof substantially unaltered. The cementitious products/articles of manufacture containing it have a high and efficient photocatalytic action.

10 Claims, 1 Drawing Sheet

(56) References Cited

U.S. PATENT DOCUMENTS

| | | | |
|---|---|---|---|
| 2005/0227854 A1 | 10/2005 | Orth-Gerber et al. | |
| 2008/0011195 A1 | 1/2008 | Grochal et al. | |
| 2008/0138516 A1* | 6/2008 | Furuya | 427/223 |
| 2010/0243426 A1* | 9/2010 | Maekawa et al. | 204/157.41 |
| 2012/0292177 A1* | 11/2012 | Thulin | 204/157.52 |

OTHER PUBLICATIONS

CN 101385968 A Chao et al. (Mar. 18, 2009) abstract only.*
WO 2009/107681 A1 Yoshikawa et al. (Sep. 3, 2009) abstract only.*
Li et al., "Synthesis and characterization of carbon-doped titania as an artificial solar light sensitive photocatalyst", Chemical Physics Letters 404 (2005) 25-29.*
"International Search Report," PCT/EP2010/006252.
E.A, Reves et al.: "Solid-state NMR and EPR analysis of carbon-doped titanium dioxide" Solid State NLiclear Magnetic Resonance, vol. 35, Feb. 26, 2009, pp. 74-81.
Kuo et al,: "Carbon-containing nano-titania prepared by chemical vapor deposition and its visible-light-responsive photocatalytic activity" Journal of Molecular Catalysis. A, Chemical, Elsevier, Amersterdam, NL, vol. 270, No. 1-2, May 7, 2007, pp. 93-100.
G. Husken et al.: "Experimental study of photocatalytic concrete products for air purification" Building and Environment, vol. 44, Apr. 22, 2009, pp. 2463-2474.
Bond et al., "Characterization of carbonaceous deposits by temperature-programmed oxidation", Journal of Catalysis (1995) 156: 295-297.

* cited by examiner

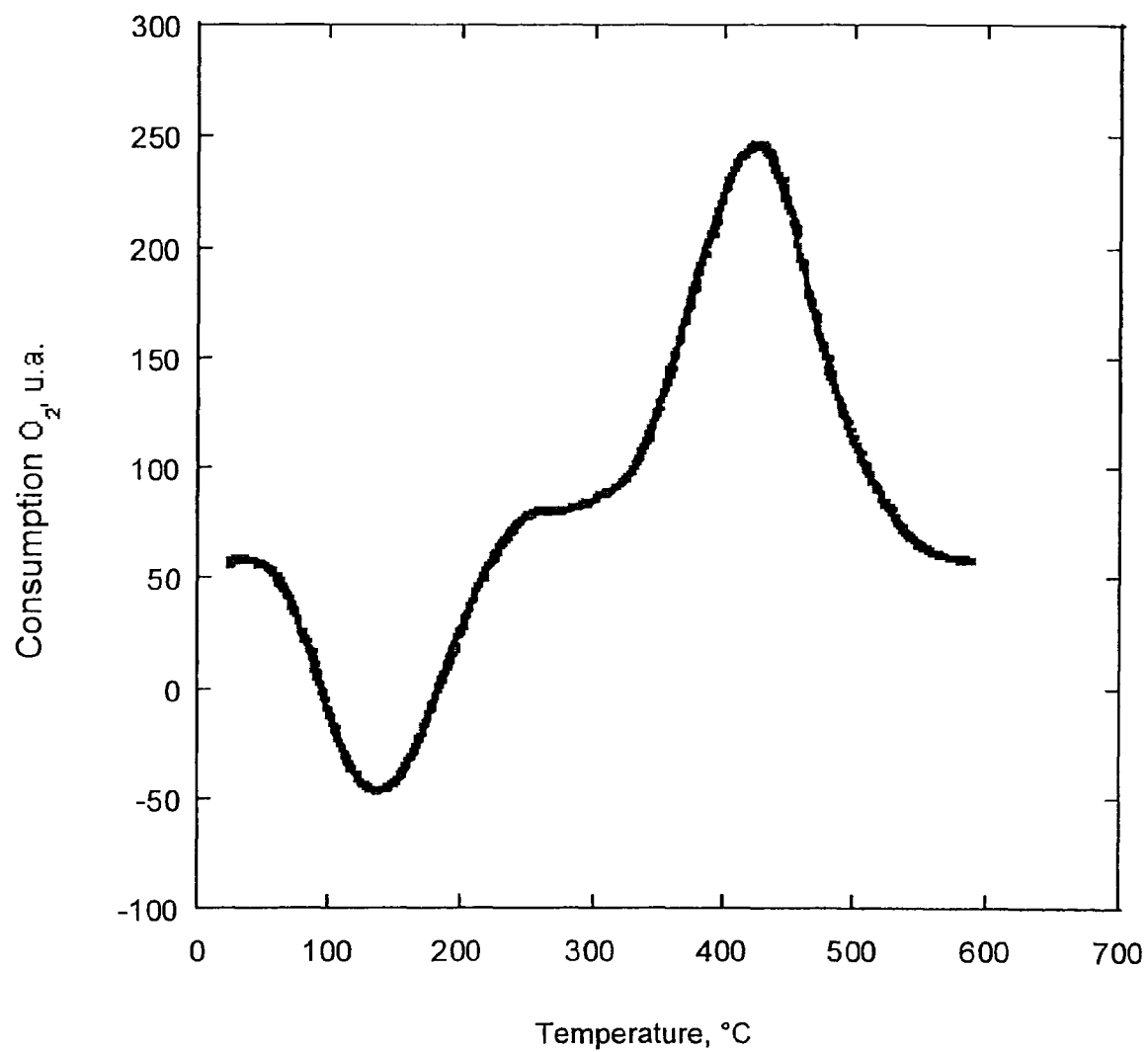

CEMENTITIOUS PRODUCTS AND ARTICLES OF MANUFACTURE CONTAINING CARBON-DOPED TITANIUM DIOXIDE

CROSS-REFERENCE TO RELATED APPLICATIONS

This application is a §371 national stage entry of International Application No. PCT/EP2010/006252, filed Oct. 14, 2010, which claims priority to Italian Application No. MI2009A 001766, filed Oct. 14, 2009, both of which are hereby incorporated herein by reference in their entirety.

FIELD OF THE INVENTION

The present invention regards the field of cementitious products and articles of manufacture having photocatalytic activity.

PRIOR ART

Titanium dioxide, in the anatase crystalline form thereof, is a known photocatalytic agent. In presence of light, it catalyses the oxidation of various contaminants present in the atmosphere, in particular aromatic hydrocarbons, facilitating the abatement process thereof (see e.g. Int. RILEM Seminar on Photocatalysis, Florence, 8-9 Oct. 2007, Photocatalytic and Surface Abatement of Organic Hydrocarbons by Anatase).

A characteristic drawback to the photocatalytic action of titanium dioxide lies in that it only uses the ultraviolet component of sunlight (about 4% of radiation) and thus it is photocatalytically scarcely active, especially in the environments with poor sunlight.

In order to overcome this drawback, attempts have been made to modify titanium dioxide through doping with other elements, allowing it to use the more consistent part of sunlight i.e. the visible light spectrum, between 400 and 700 nm. For this purpose, titanium dioxide was doped with metal ions such as lanthanum and iron, or with nitrogen (e.g. EP1178011 and EP 1254863). The advantages obtained are nevertheless scarce.

Another solution lies in doping titanium dioxide with carbon; however, the respective dosing methods (see US 2005/0226761, Kronos Inc.) are complex and expensive: in particular, they require intimately mixing titanium dioxide with compounds containing carbon, e.g. sugars; the mixture is then subjected to expensive thermal treatments (generally between 250 and 400° C.) in an oxidising atmosphere: these treatments cause a considerable loss of carbon material in form of $CO_2$ and/or CO; the treatment also requires sintering the photocatalyst, with considerable reduction of the specific surface area thereof and, hence, the reduction of the photocatalytic activity; at the end of the treatment the product must be subjected to milling in order to be used. Possible mixing with large surface area active carbons proved to be insufficient to obtain considerably active products.

Thus, the need still arises for cementitious products and articles of manufacture containing doped titanium dioxide, thus active in the visible spectrum, having a high and efficient photocatalytic action.

SUMMARY

It has now been observed that irradiating the titanium dioxide at a wavelength comprised between 300 and 400 nm, and simultaneously exposing it to a gas flow comprising an inert gas and an organic compound, leads to obtaining titanium dioxide with a high doping content, having high and efficient photocatalytic action. The product thus obtained, suitably added to cementitious materials, allows obtaining cementitious products/articles of manufacture having the above favourable properties.

DESCRIPTION OF THE FIGURES

FIG. 1: TPO (programmed temperature oxidation) graph of titanium dioxide doped according to the invention.

DETAILED DESCRIPTION

Object of the present invention are cementitious products and articles of manufacture having high and efficient photocatalytic action, containing carbon-doped titanium dioxide according to the method described herein; the method itself and the titanium dioxide obtained therethrough are object of a co-pending patent application in the name of the Applicant.

The term "carbon-doped titanium dioxide" identifies a titanium dioxide containing carbon: the latter may be present at the elemental state and/or in form of organic substance. The carbon content (doping content), is expressed as a weight percentage of elemental carbon with respect to the weight of doped titanium dioxide: it may be measured by known methods such as programmed temperature oxidation, as shown in the experimental part. The present process is particularly (though not exclusively) suitable to obtain a doping content comprised between 0.03% and 5%, preferably between 0.3 and 3%, more preferably between 1 and 1.6%.

The term "high photocatalytic action" means the capacity to obtain, in absolute values, an elevated abatement of contaminants under visible irradiation (said activity being conventionally measured as % NO conversion according to the method defined below). This capacity is believed to depend mainly on the amount of doping carbon present in the $TiO_2$ of the present invention.

The term "efficient photocatalytic action" means the capacity to obtain, comparatively, a higher abatement of contaminants under visible irradiation (conventionally measured as % NO conversion, according to the method defined below) with respect to a conventional $TiO_2$ containing the same % of doping carbon. This capacity is believed to depend mainly on physical modifications of the $TiO_2$, caused by the carbon-doping process of the present invention.

The titanium dioxide used as the initial reagent may be any titanium dioxide available on the market, present at least partly in form of anatase; it is normally used in form of powder; conveniently, it has a BET specific surface area value corresponding to the one desired in the final doped product: such value, according to the needs, may be selected within the range between 10 and 450 $m^2/g$, preferably between 50 and 450 $m^2/g$, more preferably between 300 and 350 $m^2/g$, e.g. 330 $m^2/g$.

The method was found particularly useful to produce carbon-doped titanium dioxide having BET specific surface area comprised between 255 and 400 $m^2/g$, preferably between 255 and 400 $m^2/g$.

The organic compound contained in the gaseous flow (also defined herein as a carbon compound) may be selected from among those easily vaporisable, such to be conveniently transported by a gaseous flow; there are no further limits regarding the chemical structure of this compound: e.g. hydrocarbons or derivatives thereof possibly functionalised with groups such as alkyl, hydroxy, formyl, acetyl, carboxy, alkoxycarbonyl, aryloxycarbonyl, amino, alkylamino, thio, alkylthio, etc. may be possibly used: examples of preferred products are toluene, benzene, xylene, naphthalene, derivatives thereof and mixtures thereof; a particularly preferred example is ethylbenzene.

The gaseous carrier used for transporting the abovementioned compounds is an inert gas, for example nitrogen, helium, argon, etc, or mixtures thereof, possibly mixed with further gases; for example, it is possible, for the sake of convenience, to use air: however, the presence of reactive gases (oxygen or others) as components of the carrier gas is not indispensable in any manner, in that the present process does not require the oxidation of the organic compound; in a specific embodiment of the invention, the carrier gas is exclusively made up of one or more inert gases.

The speed of the gaseous flow may be suitably selected depending on the amount of titanium dioxide to be treated, e.g. for amounts in the order of 100-200 mg, flows preferably comprised between 5 and 30 $cm^3$/min are used; evidently, the applied flows and the concentrations of organic compounds may be increased or reduced, having to treat amounts of titanium dioxide respectively greater or lower. For example, in case of processes on industrial scale, the concentrations of organic compounds may be comprised between 500 and 10000 ppm.

The flow of the carrier gas may be secured by known systems (pumps, pressurised containers, etc), suitably controlled and possibly corrected through known systems. In particular, the doping system may include analysers capable of evaluating the amount of carbon compound present in the carrier gas before and after contact with the titanium dioxide. The differential between the two concentrations, in particular the variation of this value over time, indicates the progress of the doping process: a differential variable over time indicates that the process is ongoing; a differential stable and different from zero indicates that there is no doping in progress.

The mode of contact between the gas and the titanium dioxide is not per se crucial and it may be suitably varied with reactor arrangements well known to those skilled in the art.

An important aspect of the present process lies in the irradiation of titanium dioxide, which must occur simultaneously with the flow of carbon compound on the same. Irradiation was found important to obtain a suitable doping of titanium dioxide, obtaining a consistent and stable doping content. Irradiation is carried out in a specific band of ultraviolet light, which is comprised between the wavelengths of 300 and 400 nm. Lamps of suitable power, placed at a suitable distance from titanium dioxide, e.g. between 5 and 25 cm or even submerged in the same are used for such purpose. The irradiation intensity on the titanium dioxide is preferably comprised between 10 and 1000 $W/m^2$.

The treatment temperature, i.e. that of the reaction environment and of titanium dioxide, is not crucial; it may for example be lower than 50° C., including, conveniently, the ambient temperature. Useful temperature ranges are for example 10-50° C., or 20-40° C., etc. The reaction temperature may be controlled by providing the reactor in which the contact between titanium dioxide and carrier gas occurs, with a thermostat; the gaseous mixture subjected to the flow is used in a temperature interval such that the temperature in the reactor is maintained in the desired range. The process is performed within a suitable amount of time, e.g. between 100 and 400 minutes, until it reaches the desired doping content.

The doped titanium dioxide according to the method described herein is particularly useful for making cementitious products/articles of manufacture having a long lasting photocatalytic activity.

Said cementitious products may be obtained by adding the abovementioned doped titanium dioxide to a suitable cementitious composition; the cementitious composition may be a mortar, a concrete, a plaster, a coating, a cementitious paint and the like; titanium dioxide may be incorporated in variable proportions according to the needs, e.g. between 1 and 10% in weight, with respect to the composition in the dry state. Cementitious articles of manufacture are obtained through suitable casting and hardening of the cementitious products described above. By way of non-limiting example, the article of manufacture may be a wall, a tunnel vault, a floor or an element thereof (e.g. tile, block, etc), an architectural element (e.g. roof, column, building facade, etc).

The invention is illustrated herein in a non-limiting manner by the following examples.

EXPERIMENTAL PART

Example 1

Preparation of Doped Titanium Dioxide

Operating Conditions:
Titanium dioxide: anatase, PC-500 (Millenium)
150 mg (average diameter 0.2-0.3 mm/50-70 mesh).
Gas composition: oxygen-helium 3:1
Ethylbenzene concentration: 1000 ppm
Flow speed: 16 $cm^3$/min
Irradiation wavelength: 315-400 nm.
Irradiation intensity: 20-21 $W/m^2$
Reactor temperature: 45° C.

The reactor is made up of a U-shaped sample holder (height about 15 cm; average internal diameter 2 mm). A 125 W UV lamp with Hg vapours (mod. GN 125, Helios Interquartz) irradiating it at the front is positioned at a distance of about 15 cm.

A UV probe for measuring the irradiation intensity ($W/m^2$) and a thermocouple for measuring the temperature are positioned next to the sample. The reactor is provided with a bypass for analyzing the gaseous mixture before and after the sample, recording the respective concentrations of ethylbenzene. The gaseous mixture is analysed through the chromatographic gas analysis (PORAPAK Q column).

At the beginning, the reactor is positioned in bypass: the saturator is opened and the reaction mixture is conveyed (1000 ppm EB+$O_2$+He). Once the system is stabilised (constant EB values), the reactor is inserted conveying the mixture onto the irradiated sample. No hydrocarbon is detected upon exit from the reactor, meaning that the doping is in progress. After a given period of time, the exiting hydrocarbon returns to being measurable, increasing until it reaches a constant value; this indicates that the doping process is complete.

Example 2

Evaluating the Degree of Doping

The programmed temperature oxidation analysis is performed to quantify the presence of carbon in the sample treated in example 1. The procedure comprises heating the sample under flow of an oxidising mixture (5% $O_2$/He) and continuously analysing the amount of oxygen consumed. A band corresponding to the oxidation of the different oxidisable components present is thus recorded. The area beneath the band, corresponding to the consumed oxygen, is suitably calibrated using a known sample.

The system is provided with a flow regulator connected to an oxidising mixture cylinder 5% $O_2$/ The reactor is made up of a U-shaped sample-holder made of quartz inserted in an oven connected to a temperature programmer (Eurotherm 808). The temperature of the sample is measured by means of a thermocouple inserted in the sample itself. A trap filled with soda lime and anhydrone (which allows blocking $CO_2$ and $H_2O$ formed during the reaction) is positioned after the sample-holders. The exiting gas is conveyed to a thermo conductivity detector interfaced with a computer.

Operating Conditions:
Sample amount: 50 mg (average diameter 0.2-0.3 mm/50-70 mesh)
Flow speed: 40 $cm^3$/min
Heating rate: 10° C./min up to 800° C.

The oxidation test performed on the product of the example 1 revealed the presence of carbon in amount of 1.3%.

Example 3

Characterising the Product

The BET specific surface area of titanium dioxide was determined by nitrogen adsorption, before and after the doping process carried out in example 1. The value of both measurements was the same, equivalent to 330 $m^2$/g. Thus, the doping method used did not cause any reduction of the specific surface area of the photocatalyst.

The effect produced on the specific surface area by the thermal treatment described by US 2005/0226761 was verified at the same time. The specific surface area before and after such thermal treatment was respectively equivalent to 330 $m^2$/g and 160 $m^2$/g. The method described in US 2005/0226761 thus led to a reduction of the specific surface area of the photocatalyst equivalent to 170 $m^2$/g.

Example 4

Evaluation of the Photocatalytic Activity of Carbon-Doped $TiO_2$

The system is provided with two flow regulators connected respectively to a cylinder with 1000 ppb NO/air and to an air cylinder. In such manner, through suitable dilution, it is possible to convey to the NOx analyser of a mixture having a known concentration of NO/air (about 100 ppb NO/air, obtained by diluting 1/10 the initial mixture). The part of the system relevant to the reactor is made up of a U-shaped sample holder (height about 15 cm; internal diameter 2 mm).

A visible lamp (low consumption, 14 W) which irradiates it at the front is positioned at a distance of about 15 cm. A visible probe (400-1050 nm) for measuring the irradiation intensity ($W/m^2$) and a thermocouple for measuring the temperature are positioned next to the sample. The reactor is provided with a bypass for analysing the gaseous mixture before and after the sample, by recording the respective concentrations of NO. The reactor is kept covered to prevent the light from reaching the sample before the reaction start.

After preheating the analyser and before starting the measurement, the entire line and the sample are cleaned in a chromatographic airflow (at least 1000 ml/min). Then the reaction mixture is conveyed to bypass.

Once the system is stabilised, the NO/air mixture is conveyed to the sample. Upon stabilization of the read NO value ($_{initial}NO$), the visible lamp lights up, the reactor is uncovered and the sample is irradiated. A quick reduction of NO, reaching a minimum value ($_{minimum}NO$) within a few minutes, is observed. The % conversion of NO is calculated according to the $_{initial}NO$ and the $_{minimum}NO$ values, according to the formula:

% conversion=[($_{initial}NO-_{minimum}NO$)/$_{initial}NO$]×100

Operating Conditions:
Sample amount: 100 mg (50-70 mesh).
Flow speed: 1000 ml/min total
Irradiation intensity: 7 $W/m^2$
Temperature: 23-25° C.

The doped product obtained according to example 1, subjected to the aforementioned photocatalytic activity test, revealed an 88% conversion of NO, thereby showing a high photocatalytic action.

A further product was simultaneously prepared using the same methods and components of example 1, with the sole difference that the mixture ($O_2$+He) was replaced by nitrogen. This product, tested under the same operating conditions, revealed a 91% conversion of NO. This result, besides confirming the high photocatalytic action of the $TiO_2$ according to the invention, further shows that the presence of oxygen in the carrier does not contribute to the obtainment of the product doped according to the invention.

Example 5

Evaluation of the Photocatalytic Activity of Carbon-Doped $TiO_2$ (Industrial Scale-Up)

Based upon example 1, a fluidized bed reactor was provided to scale up the process according to the present invention. The reactor consisted in a 1 l flask equipped with a polyethylene flexible rotating paddle and a Teflon pipe (4 mm) for fluxing the gas onto the $TiO_2$; the reactor was irradiated by a UVA source (about 45 $W/m^2$).

The $TiO_2$ powder was introduced into the reactor and therein kept under constant stirring through a at the speed of 30 rpm. The powder was treated as described in example 1, for a time of 5 hours, followed by a thermal treatment (140° C. for 2 hours) to desorb unreacted ethylbenzene. Ethylbenzene vapours were generated by means of a bubbler using chromatographic air or nitrogen as carrier gas.

Operating Conditions:
Titanium dioxide (anatase PC-105, Millenium)
Carrier gas composition: nitrogen/chromatographic air
Ethylbenzene concentration: saturated vapour
Irritation wavelength: 315-400 nm
Reactor temperature: 30° C.

Example 6

Evaluation of the Photocatalytic Activity of Carbon-Doped $TiO_2$ (Comparative Test)

This test was performed to compare the photocatalytic efficiency of a product according to the invention with a commercial carbon-doped titanium dioxide available on the market (Kronos vlp 7000). In order to work with comparable samples, a product of the invention was produced, having carbon content as close as possible to the commercial product.

For this purpose, the carbon content of the Kronos vlp 7000 was first assayed in an induction oven (ELTRA CS-800) in $O_2$ current at 2000° C. according to norm EN 13639. The band gap was calculated applying the Kubelka—Munch function to the absorbance spectra obtained from a spectrophotometer of the Perkin Elmer UV/Vis type (Spectrometer Lambda 2) equipped with an integrating sphere. The result indicated a 0.22% total organic carbon content.

Subsequently, by following the general procedure illustrated in example 5, adapting the irradiation/gas treatment parameters (carrier gas=ethylbenzene+air), a carbon-doped titanium dioxide of the invention was produced (sample A) which, subjected to the above carbon assessing procedure, showed a 0.19% total organic content.

The photocatalytic activity of the two samples was then tested and measured on the basis of norm UNI 11247, applying the following modifications:
- the sample was made exclusively of $TiO_2$ powder (5 g), uniformly spread on a 61 $cm^2$ surface.
- a visible, low consumption fluorescent-type lamp was used (Osram Dulux Superstar 24 W cold light) with UV irradiation intensity 0.16 $W/m^2$ and 4000 lux lightening.
- the % NO conversion was calculated according to the initial NO and the $_{minimum}$NO values, according to the formula:

% NO conversion=[($_{initial}$NO−$_{minimum}$NO)/$_{initial}$NO]×100

The results obtained are the following:

|  | TOC % (total organic content) | NO % conversion |
|---|---|---|
| Sample A | 0.19 | 32.0% |
| Kronos 7000 vlp (reference) | 0.22 | 19.5% |

As evident, sample A produced in accordance with the present invention showed a much higher % NO conversion compared to the reference product. An efficient photocatalytic action is thereby shown.

Example 7

Evaluation of the Photocatalytic Activity of Carbon-Doped $TiO_2$ of the Invention within Cementitious Specimens This tests was performed to verify if and to what extent the above measured photocatalytic efficiency of carbon-doped $TiO_2$ of the invention is maintained when the latter is mixed with cementious materials in photocatalytic products/articles of manufacture.

A cementitious photocatalytic binder was thus prepared using CEM I 52.5 white Rezzato cement (according to norm UNI 197/1), containing 3% of a carbon-doped TiO2 prepared according to example 5 (PC-105-Ethylbenzene-air). The binder was converted into a mortar, form which cementitious specimens where formed, destined to photocatalytic characterization according to the above described NO conversion test. The specimens were prepared according to the method of standard mortar (EN 196), using the following conditions:
- photocatalyst-containing binder: 450 g
- CEN standard sand: 1350 g
- water: 225 g
- shape/dimensions of the specimen: parallelepiped, 80×80×10 mm.

All specimens were produced and then seasoned for 28 days under controlled temperature and humidity conditions (T 20° C., RH>95%). After seasoning, the specimens were assayed in the NO conversion test described above. The samples of the invention showed a 23% NO conversion, thereby confirming a high photocatalytic action.

The invention claimed is:

1. A process to obtain carbon-doped titanium dioxide, consisting of irradiating titanium dioxide, exposed to a gas flow comprising an inert gas and an organic compound, at a wavelength comprised between 300 and 400 nm, wherein the temperature of the reaction environment and of the titanium dioxide is maintained lower than 50° C.

2. Process according to claim 1, wherein the irradiation intensity of titanium dioxide is comprised between 10 and 1000 $W/m^2$.

3. Process according to claim 1, wherein the organic compound is chosen from toluene, benzene, xylene, naphthalene, derivatives thereof and mixtures thereof.

4. Process according to claim 1, wherein the organic compound is ethylbenzene.

5. Process according to claim 1, wherein the gas flow includes the organic compound at a concentration comprised between 500 and 10000 ppm.

6. Process according to claim 1, wherein the doped titanium dioxide has a BET specific surface area value comprised between 10 and 450 $m^2/g$.

7. Process according to claim 6, wherein the doped titanium dioxide has a BET specific surface area value comprised between 300 and 350 $m^2/g$.

8. Process according to claim 1, wherein the doped titanium dioxide has a carbon content comprised between 0.03% and 5% by weight.

9. Process according to claim 1, wherein the doped titanium dioxide has a carbon content comprised between 0.3% and 3% by weight.

10. Process according to claim 1, wherein the doped titanium dioxide has a carbon content comprised between 1% and 1.6% by weight.

* * * * *